United States Patent [19]

Tashiro

[11] Patent Number: 4,678,284

[45] Date of Patent: Jul. 7, 1987

[54] ANTIFLOCCULATING AGENT FOR SPACERS IN LIQUID CRYSTAL DISPLAYS

[75] Inventor: Yoshizo Tashiro, Furukawa, Japan

[73] Assignee: Alps Electric Co., Ltd., Japan

[21] Appl. No.: 630,947

[22] Filed: Jul. 16, 1984

[30] Foreign Application Priority Data

Jul. 16, 1983 [JP] Japan .................................. 58-128726

[51] Int. Cl.$^4$ ............................................. G02F 1/13
[52] U.S. Cl. .................................................... 350/344
[58] Field of Search ....................... 523/168; 350/344; 427/214, 221, 222; 209/5, 9; 428/348; 524/480, 481, 487

[56] References Cited

U.S. PATENT DOCUMENTS

| | | | |
|---|---|---|---|
| 3,639,148 | 2/1972 | Moore et al. | 428/348 X |
| 3,867,178 | 2/1975 | Ritter et al. | 427/214 |
| 4,127,619 | 11/1978 | Godfrey | 524/481 |
| 4,165,157 | 8/1979 | Kobale et al. | 350/344 X |
| 4,249,800 | 2/1981 | Spruijt | 350/344 X |
| 4,298,448 | 11/1981 | Müller et al. | 350/355 |
| 4,435,469 | 3/1984 | Fay | 428/348 |
| 4,500,661 | 2/1985 | Laksmanan | 524/487 X |

FOREIGN PATENT DOCUMENTS 0102922  6/1983  Japan .................................. 350/344

Primary Examiner—John K. Corbin
Assistant Examiner—David Lewis
Attorney, Agent, or Firm—Guy W. Shoup

[57] ABSTRACT

A liquid crystal display comprises two sheets of plastic film, two transparent electrodes respectively formed on one sides of the sheets and opposed to each other with spacer powder therebetween, and liquid crystal material sealed-in between the electrodes. The spacer powder is coated with a hot melt adhesive, such as vinyl acetate adhesive or polyethylene adhesive, by adding an antiflocculating agent, such as polyethylene wax, and spacer powder, such as aluminum oxide, to suspension of the hot melt adhesive, and then drying the suspension. The resultant powder is fixed to the sheets by the adhesive.

4 Claims, 3 Drawing Figures

ANTIFLOCCULATING AGENT FOR SPACERS IN LIQUID CRYSTAL DISPLAYS

FIELD OF THE INVENTION

The present invention relates to a liquid crystal display and, more particularly, to spacer material for holding the two sheets of the display at a given distance from each other.

BACKGROUND OF THE INVENTION

It is known that spacer material such as alumina powder is dispersed in a liquid crystal display which consists essentially of two sheets made of plastic film to keep the space between the sheets constant. According to this prior art method, the liquid crystal display is fabricated by injecting liquid crystal material into the space between the sheets in a vaccuum while holding the spacer material between the sheets and then sealing the assembly.

Dispersion of spacer material in a liquid crystal cell is often used for liquid crystal displays whose two base sheets are made of glass. However, in case where this method is applied to a liquid crystal display whose two base sheets are made of film, when a load test is made for a long time, spacer material tends to collect around the electrodes. Accordingly, if a twisted nematic liquid crystal is viewed through a polarizing plate, one will note that the portion where the spacer is collected together is darker. When the amount of the dispersed spacer is large, namely 20 to 30 or more particles/mm$^2$, this phenomenon becomes conspicuous. When liquid crystal material is injected, the device is sealed in such a condition that the liquid crystal layer is at a pressure slightly lower than the atmospheric pressure and hence the spacer is pressed between the sheets. When the quantity of the spacer is small, most of the particles cannot move because they are pressed between the sheets. When the quantity is large, however, particles of smaller diameters can easily move about among particles of larger diameters, and therefore they move around inside the liquid crystal layer, thereby causing local collection of spacer material.

THe aforementioned phenomenon is now discussed in somewhat more detail. When spacer alone is dispersed in large quantities and the device is put to a load test, the spacer tends to collect along a specific direction near the electrodes. In case where an upper sheet 1 was rubbed upwardly to the right at an angle of 45° and a lower sheet was rubbed downwardly to the right at an angle of 45°, as shown in FIG. 1, the spacer collects in the hatched portion 3 as shown in FIG. 2 for the following cause. If many spacer particles exist in a liquid crystal display, when the device is energized, a number of disclinations are produced in a manner similar to cases where impurity atoms in a metal line up along crystalline grain boundaries, and the spacer collects on the disclinations. If the dislinations are formed like a ring, the spacer also collects in the form of a ring. The ring of the disclinations becomes smaller so that it may become stabler in terms of energy. The particles of spacer accordingly collect together. Also, when either sheet of film is physically moved for one cause or another, a number of disclinations are generated around the particles of spacer which act as nuclii, and as the disclinations disappear, the spacer collects. The boundary of the display portion of a liquid crystal display is a boundary of liquid crystal domains and is a kind of disclination. The disclinations which were created around the spacer particles are absorbed into this stable disclination at the boundary and so the particles collect on the boundary of the display portion. The direction of movement of the disclinations is understood as described below.

The disclinations in a liquid crystal layer are in contact with the upper and lower sheets of film. Taking into account the gravity, it is assumed that movement at the upper junctions is made with easier than movement at the lower junctions. During a load test, application of an alternating electric field wobbles the liquid crystal, moving the disclinations in the direction in which the upper sheet was rubbed. As a result, the particles of spacer are moved to the right at an angle of 45° to the electrode in the display portion until they reach the boundary, whence they are discharged from the display portion one after another. Thus, the spacer is stored outside the liquid crystal cell. Outside the display pattern, the spacer gathers around the near boundary of the display portion as indicated by the hatched portion in FIG. 2. When spacer is not dispersed uniformly in the liquid crystal cell, even if the quantity of the spacer is less than 10 particles/mm$^2$, some locations may become conspicuous somewhat.

SUMMARY OF THE INVENTION

It is an object of the present invention to provide a liquid crystal display which is free of the foregoing difficulties with the prior art technique, is capable of effectively preventing movement of spacer, and has a high reliability.

It is another object of the invention to provide a method of fabricating the liquid crystal display described just above.

The first-mentioned object is achieved in accordance with the teachings of the invention by providing a liquid crystal display which comprises two sheets of plastic film, transparent electrodes respectively formed on one sides of the sheets and opposed to each other with spacer powder therebetween, and liquid crystal material sealed-in between the electrodes, the spacer powder being coated with a hot melt adhesive by means of which the spacer powder is fixed to the sheets.

The second-mentioned object is achieved by providing a method of fabricating a liquid crystal display which comprises two sheets of plastic film, transparent electrodes respectively formed on one sides of the sheets and opposed to each other with spacer powder therebetween, and liquid crystal material sealed-in between the electrodes, said method comprising the steps of: adding an antiflocculating agent to suspension of the aforementioned hot melt adhesive, adding spacer powder to the suspension, and then drying it to coat the spacer powder with the adhesive, causing the two sheets to be opposed to each other with the powder therebetween, and heating the assembly to fix the powder to the sheets of plastic film.

Other objects and features of the invention will appear in the course of description thereof which follows.

DETAILED DESCRIPTION OF THE INVENTION

The plastics which can be used for the material of the sheets of a liquid crystal display according to the invention include polyester sulfone, polyimides, and polyester.

The hot melt adhesives which can be used in the invention include vinyl acetate adhesives, polyethylene adhesives, polyamide adhesives, and rubber adhesives.

The spacer powders that can be employed in the invention include aluminum oxide and silicon oxide. Suspension of a hot melt adhesive is used to coat such spacer powder with the adhesive. The suspension is applied to the surface of the powder by a suitable means such as dipping. Then, the suspension is dried to form a coating of the adhesive. In the process of drying, there arises a possibility that the particles of the spacer flocculate together into larger masses. This unwanted phenomenon can effectively be prevented by adding an anti-flocculating agent such as polyethylene wax to the suspension of the adhesive.

EXAMPLE 1

A conductive film consisting of ITO (150 $\Omega/\square$) was formed on one side of a sheet of polyether sulfone (PES) by sputtering. Then, a tar resist which is manufactured by Yoshikawa Chemical Industry Co., Ltd., Japan, under the product name of 340-C was printed on the film. Thereafter, a transparent electrode of a desired pattern was formed by etching. The film was then subjected patterning operation except for its seal portion by an ordinary method such as dipping or exposure to light. When dipping was utilized, aqueous solution of polyvinyl alcohol to which a diazo compound was added might be provided to dip the film. Subsequently, an epoxy resin adhesive which is manufactured by EHC Co., Ltd. under the product name of SE4500 was printed on the seal portion, and then alumina spacer coated with vinyl acetate was shaked over it.

The spacer coated with vinyl acetate was produced as follows. A hot melt adhesive consists principally of vinyl acetate. Polyethylene wax was added to the adhesive up to 10 to 20% for reducing the viscosity and facilitating pulverization. Then, the mixture was introduced into water to form an emulsion having solid mass ranging from 10 to 40%. Subsequently, alumina powder which is manufactured by Showa Denko K. K., Japan, under the product name of PS15, was put into a container, and then the aforementioned emulsion was introduced into the container such that the alumina powder was just immersed in it. After stirring the mixture, it was dried until the moisture contained in it was removed at room temperature or at a temperasture of about 40° C. If necessary, the dried powder might be put into an agate mortar before being crushed sufficiently into powder. Then, the powder was put into a vibrating sieve for a few hours to select particles whose average diameter approximately ranges from 20 to 50 $\mu$m, and these particles coated with vinyl acetate were used as the spacer.

Figure 1:
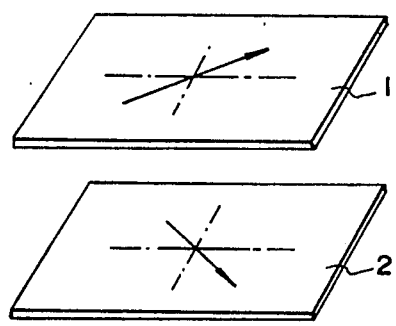
FIG. 1 is a schematic represenation of two sheets of a liquid crystal display, for showing the directions in which the sheets were rubbed.
Figure 2:
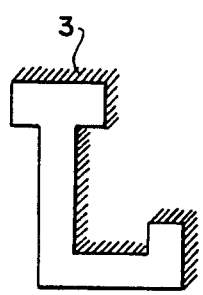
FIG. 2 is a view showing the manner in which conventional particles of spacer collect.
Figure 3:
FIG. 3 is an enlarged cross-sectional view of a particle of spacer according to the present invention.

FIG. 3 shows an enlarged cross-sectional view of one particle of this spacer. One particle 4 of alumina powder is coated with the hot melt adhesive 5 consisting principally of vinyl acetate and containing polyethylene wax.

This spacer powder was put into a round bottom flask having two tubings of glass. Then, nitrogen gas was blown in through one of the tubings, while the spacer powder was blown out through the other tubing to deposit it uniformly on the above-mentioned film undergone the seal printing at a rate of 1 to 20 particles /mm$^2$. Another film coated with polyvinyl alcohol was stuck from above to the film. Then, this assembly was inserted between two sheets of glass. The assembly was then cured for 1 hour at a temperature of 140° C. while pressed between the sheets to form a liquid crystal cell, into which liquid crystal material was sealed.

This liquid crystal cell was put to a load test at 10 V. No collection of the spacer was seen for a period as long as 1000 hours. A conventional cell which had a similar quantity of spacer particles of 15 $\mu$m not coated with vinyl acetate was also brought to the same test for comparison purposes. A slight collection of the spacer was observed to be produced outside the electrode after 300 hours.

An ordinary alternating current load test has shown that a nematic liquid crystal employing polyvinyl alcohol as its orientating film produces an electric current that increases with time. On the other hand, a similar test has shown that a liquid crystal display using films of polyester sulfone generates an electric current that tends to decrease with time. More specifically, when a liquid crystal display using a spacer not coated with vinyl acetate is driven by a DC voltage of 10 V, the electric current produced decreases by 0 to 5% for 500 hours. This decrease in current is also seen in the spacer of the invention.

EXAMPLE 2

Four hot melt adhesives consisting of a polyester adhesive, a polyethylene adhesive, a polyamide adhesive, and a rubber adhesive, respectively, and containing 10 to 20% polyethylene wax to facilitate pulverization were prepared to produce emulsions having 10 to 50% solid mass. Then, in the same way as Example 1, alumina spacer was dipped to these emulsions, and the resultant powders were coated with a hot melt adhesive to produce spacers which were used for liquid crystal displays. When an alternating current of 10 V is applied to these displays, no collection of spacer was found in any display even after the lapse of 1000 hours.

Since the invention is constructed described above, it can effectively prevent movement of spacer and hence it provides a highly reliable liquid crystal display.

What is claimed is:

1. In a liquid crystal display having two sheets of plastic film, transparent electrodes respectively formed on one sides of the sheets and opposed to each other with spacer particles therebetween, and liquid crystal material sealed-in between the electrodes,
   the improvement wherein the spacer particles is coated with a hot melt adhesive containing an antiflocculating agent and is fixed to the sheets of plastic film by the adhesive.

2. A method of fabricating a liquid crystal display comprising two sheets of plastic film, transparent electrodes respectively formed on one sides of the sheets and opposed to each other with spacer particles therebetween, and liquid crystal material sealed-in between the electrodes, said method comprising the steps of:
   adding an antiflocculating agent to facilitate pulverization in suspension of a hot melt adhesive,
   adding spacer particles to the suspension, then drying the suspension to coat the spacer particles with the adhesive, disposing two sheets of plastic film in opposed relation to each other with the spacer particles therebetween, and heating the assembly to fix the spacer particles to the sheets.

3. The improved liquid crystal display of claim 1 wherein the antiflocculating agent is polyethylene wax.

4. The improved liquid crystal fabrication of claim 2 wherein the antiflocculating agent in polyethylene wax.

* * * * *